(12) United States Patent
Schipper et al.

(10) Patent No.: US 8,106,822 B2
(45) Date of Patent: Jan. 31, 2012

(54) SYSTEM AND METHOD FOR GNSS POSITION AIDED SIGNAL ACQUISITION

(75) Inventors: Brian Schipper, Brooklyn Park, MN (US); Kartik B. Ariyur, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 415 days.

(21) Appl. No.: 12/033,822

(22) Filed: Feb. 19, 2008

(65) Prior Publication Data
US 2009/0207076 A1    Aug. 20, 2009

(51) Int. Cl.
*G01S 19/24* (2010.01)
(52) U.S. Cl. .................................. 342/357.63
(58) Field of Classification Search .............. 342/357.15, 342/357.63
See application file for complete search history.

(56) References Cited

U.S. PATENT DOCUMENTS

| | | | | |
|---|---|---|---|---|
| 4,601,005 A | * | 7/1986 | Kilvington | 708/3 |
| 4,983,980 A | * | 1/1991 | Ando | 342/357.15 |
| 6,133,873 A | * | 10/2000 | Krasner | 342/357.12 |
| RE37,408 E | * | 10/2001 | Loomis et al. | 342/357.12 |
| 6,825,805 B2 | * | 11/2004 | Rowitch | 342/357.15 |
| 2003/0231132 A1 | * | 12/2003 | Park et al. | 342/357.15 |
| 2007/0046536 A1 | * | 3/2007 | Jia et al. | 342/357.12 |

FOREIGN PATENT DOCUMENTS
WO    WO0206987    1/2002

OTHER PUBLICATIONS

European Patent Office, "European Search Report", Apr. 20, 2011, Published in: EP.

* cited by examiner

*Primary Examiner* — Gregory C Issing
(74) *Attorney, Agent, or Firm* — Fogg & Powers LLC

(57) ABSTRACT

A Global Navigation Satellite System (GNSS) device, such as the Global Positioning System (GPS) device, uses satellite orbital position information from almanac and/or ephemeris data to change a search parameter, such as reducing the number of analyzed frequency bins or setting signal strength threshold, so that satellite signal acquisition times are reduced. An exemplary embodiment estimates an orbital position for at least one GNSS satellite based upon at least one of almanac data and ephemeris data, detects a signal emitted from the at least one GNSS satellite, and based upon the estimated orbital position information for the at least one GNSS satellite that is determined from the almanac data and the ephemeris data, adjusts at least one parameter used in the analysis of the detected signal.

20 Claims, 4 Drawing Sheets

SYSTEM AND METHOD FOR GNSS POSITION AIDED SIGNAL ACQUISITION

BACKGROUND OF THE INVENTION

The Global Navigation Satellite System (GNSS), of which one component is the Global Positioning System (GPS), is a satellite-based navigation system. GNSS permits land, sea, and airborne users to determine their three-dimensional positions, velocities, and time. GPS uses NAVSTAR (NAVigation Satellite Timing and Ranging) satellites. The current satellite constellation consists of 21 operational satellites and 3 active spares. This constellation provides a GNSS device to receive signals from four to twelve GNSS satellites at any given time. A minimum of four GNSS satellites allows the GNSS device to compute its position (latitude, longitude, and altitude) and GNSS system time. Altitude is typically referenced to mean sea level. The GNSS satellite signal from the GNSS satellites contains information used to identify the GNSS satellite, as well as to provide position, timing, ranging data, satellite status, and the updated ephemeris (orbital parameters). Coarse orbital information is available in the almanac data. The ephemeris data contains higher accuracy orbital position information.

Satellite signal acquisition requires a relatively long period of time, particularly during a cold start initialization of the GNSS device (the GNSS device has no current location information for itself and/or for any satellites, and/or the GNSS device does not know time). During warm start initialization, the GNSS device does have some information, such as relatively recent almanac data and/or ephemeris data, and/or an estimate of time that may be used to speed up the GNSS satellite signal acquisition process. However, the time to acquire a GNSS satellite signal for one GNSS satellite, and the total time required to acquire four or more GNSS satellite signals, is very noticeable to the user of the GNSS device. That is, the user of the GNSS device has to wait for some discernable period of time until position information is presented. Accordingly, it is desirable to reduce the GNSS satellite signal acquisition times.

SUMMARY OF THE INVENTION

Systems and methods of acquiring Global Navigation Satellite System (GNSS) signal, such as the Global Positioning System (GPS) signal, are disclosed. An exemplary embodiment uses satellite orbital position information from almanac and/or ephemeris data to adjust at least one signal processing parameter, such as reducing the number of analyzed frequency bins or setting a signal strength threshold, so that GNSS satellite signal acquisition times are reduced.

An exemplary embodiment estimates an orbital position for at least one GNSS satellite based upon at least one of almanac data and ephemeris data, detects a signal emitted from the at least one GNSS satellite, and based upon the estimated orbital position information for the at least one GNSS satellite that is determined from the almanac data and the ephemeris data, adjusts at least one parameter used in the analysis of the detected signal In accordance with further aspects, an exemplary embodiment is an apparatus that is operable to acquire a GNSS satellite signal comprising a GNSS front end operable to receive an GNSS signal emitted by at least one GNSS satellite and operable to frequency downconvert the GNSS signal into a downconverted GNSS satellite signal by mixing the GNSS satellite signal with a local oscillator signal to shift the carrier frequency of the incoming GNSS satellite signal and a GNSS system processor. The GNSS system processor is operable to convert the downconverted GNSS satellite signal to a digital GNSS satellite signal, process the digital GNSS satellite signal into a plurality of frequency bins, estimate an orbital position for at least one GNSS satellite based upon at least one of almanac data and ephemeris data, and based upon the estimated orbital position information for the at least one GNSS satellite, adjust at least one signal processing parameter used in a GNSS satellite signal acquisition process, and based upon the adjusted signal processing parameter, identify at least one of the frequency bins that corresponds to the GNSS signal emitted by the GNSS satellite.

BRIEF DESCRIPTION OF THE DRAWINGS

Preferred and alternative embodiments are described in detail below with reference to the following drawings.

DETAILED DESCRIPTION OF THE PREFERRED EMBODIMENT

Embodiments of a Global Navigation Satellite System (GNSS) device 100, such as the Global Positioning System (GPS) device, uses estimated satellite orbital position information obtained from almanac and/or ephemeris data for setting signal strength threshold, so that GNSS satellite signal acquisition times are reduced. The almanac and/or ephemeris data may be retrieved from memory or received in a detected satellite signal. The GNSS device 100 may be interchangeably referred to as a GPS device, satellite position detection device, or the like.

Figure 1:
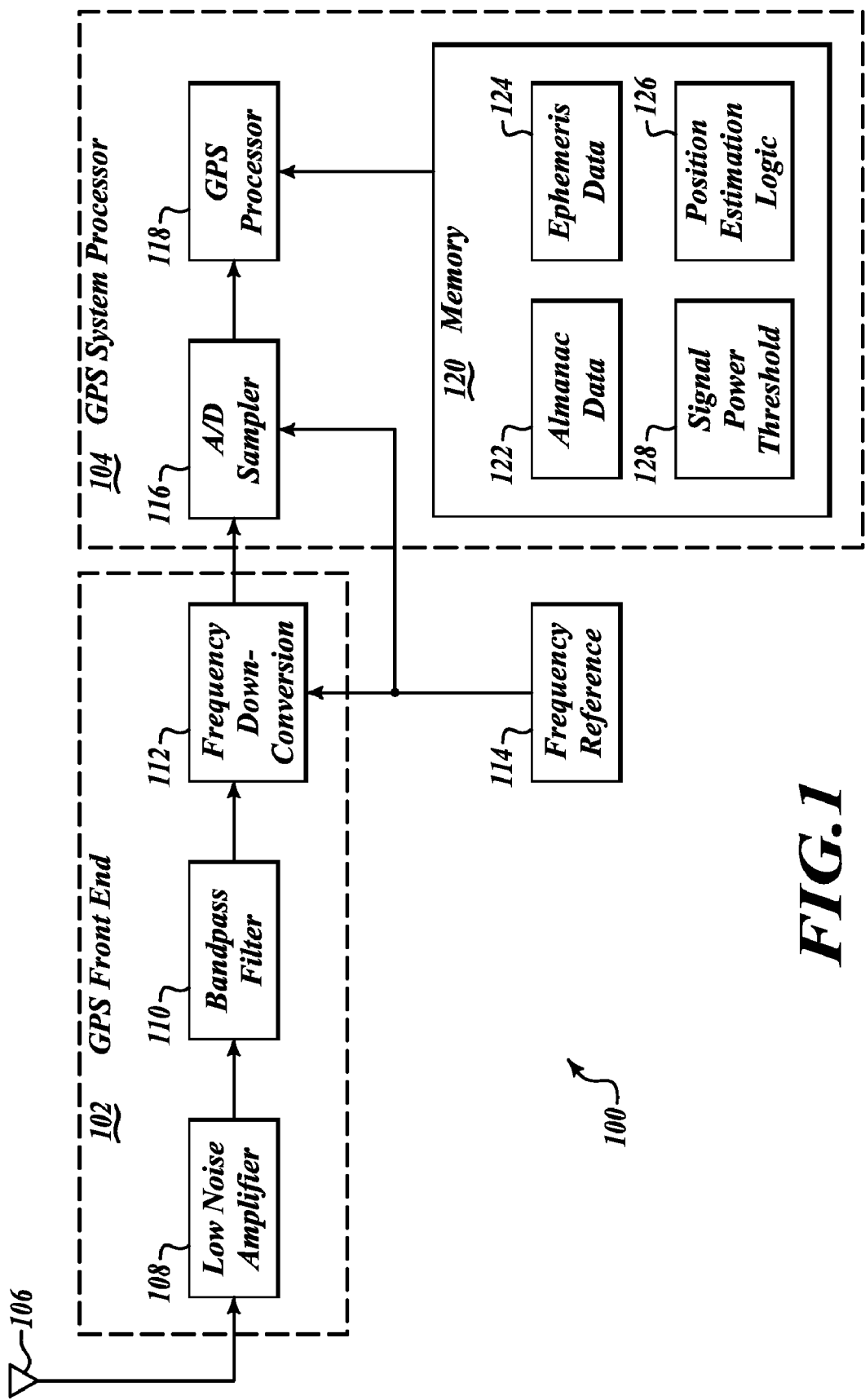
FIG. 1 is a simplified block diagram of a Global Navigation Satellite System (GNSS) device embodiment.

FIG. 1 is a simplified block diagram of a GNSS device embodiment. The GNSS device 100 includes a GNSS front end 102 and a GNSS processor system 104.

The GNSS front end 102 receives the incoming analog GNSS satellite signal from a GNSS antenna 106, which detects signals from a plurality of visible GNSS satellites. The analog GNSS satellite signal is amplified by a low noise amplifier 108 and is filtered by a bandpass filter 110. The low noise amplifier 108 and the bandpass filter 110 may be provided in multiple stages, if desired.

The analog GNSS satellite signal at the output of the bandpass filter 110 is downconverted in a frequency downconverter 112 by mixing the analog GNSS satellite signal with a local oscillator signal to shift the carrier frequency of the incoming analog GNSS satellite signal to a lower and more manageable frequency band. This downconversion can be performed multiple times to bring the frequency of the analog GNSS satellite signal down in steps to the final desired frequency. Each mixing operation produces a high frequency information band along with the lower frequency band. Therefore, each mixing stage of the frequency downconverter 112 may require a bandpass filter to remove the information in the corresponding higher frequency band. A frequency reference 114 provides a frequency reference for the frequency downconverter 112.

The GNSS processor system 104 includes an analog to digital (A/D) sampler 116 which, in response to the signal from the frequency reference 114, converts the downconverted analog GNSS satellite signal to a digital GNSS satellite signal. A GNSS processor 118 uses the downconverted digital GNSS signal to first determine ranging and satellite information for the GNSS satellites in view of its antenna at the time, and to then determine latitude, longitude, altitude, and/or GNSS system time.

Acquisition and tracking can be performed by the GNSS processor 118 in software. Acquiring and tracking the GNSS satellite signals principally means that the code and frequency offsets between GNSS satellites and GNSS device 100 are determined and tracked on a regular basis. A typical value of how often the tracking loops execute is 1000 times per second. GNSS satellite position is determined from these offsets, but it can be done faster or slower depending on the processing capability available in the GNSS receiver.

A GNSS satellite transmits a signal that is detected by the GNSS device 100. The transmitted GNSS signal from each GNSS satellite is modulated with a psuedo-noise (PN) code that is a sequence of 1023 chips. Further, the GNSS satellite signal is modulated by an additional data stream which contains almanac data and the ephemeris data.

The PN code in the received GNSS satellite signal is periodically repeated. The GNSS device 100 generates a plurality of replica PN codes at many different frequencies, which are compared with the received GNSS satellite signal using a correlation process. Fast Fourier Transform (FFT) techniques are used to facilitate the correlation process. An exemplary FFT process is described in U.S. Patent publication 2007/0046536 to Zhike et. al, entitled "Fast Fourier Transform with Down Sampling Based Navigational Satellite Signal Tracking", which is incorporated by reference herein. Any suitable GNSS satellite tracking system that analyzes signals using a plurality of frequency bins may use embodiments described herein to more quickly and/or more accurately acquire a GNSS satellite signal.

The FFT analysis process correlates the GNSS satellite signal information to generate correlation values that are stored into a series of frequency bins over a time range. The GNSS satellite signal will have its unique PN code corresponding to at least one particular frequency bin. Thus, the PN signal corresponds to at least one of the frequency bins that are searched by the GNSS device 100 during the GNSS signal acquisition process. The PN code may be detectable over a relatively small frequency range, and thus, the GNSS satellite signal may be detectable in several adjacent frequency bins depending upon the frequency range of the frequency bins defined during the FFT analysis process.

Once the GNSS signal is "acquired" (when the frequency and time of the GNSS satellite signal is identified by the correlation process), the GNSS processor 28 may determine its relative distance to the GNSS satellite. When at least four GNSS satellite signals have been acquired, and the corresponding GNSS satellite orbital positions determined, a least squared error triangulation process is used to determine the location of the GNSS device 100 relative to the GNSS satellites (GNSS position).

Since the position of the GNSS satellites are known relative to the earth, the GNSS processor 118 determines latitude and longitude of the GNSS device 100. The GNSS processor 118 can also determine altitude (or depth) if the GNSS device 100 operates in three dimensional space. The GNSS processor 118 may further determine rate and GNSS system time from the acquired GNSS signal.

As noted above, the GNSS data in a received GNSS satellite signal is processed by the GNSS processor 118 in the frequency domain (instead of the time domain). Frequency domain processing techniques use FFT for Wavelet Multi-resolution Analysis (WMA). Such software based GNSS signal acquisition may be faster than hardware based signal acquisition, and software processing can eliminate much of the front end processing. However, while frequency domain techniques used during signal acquisition are faster than conventional time domain techniques, there will still be a discernable amount of time required to complete the computations required for GNSS satellite signal acquisition. Thus, a delay can occur from the end of the batch data collection and the completion of the signal acquisition phase depending on the processor 118 speed.

The GNSS system processor 118 further includes a memory 120. As noted above, the received GNSS satellite signal includes almanac data and ephemeris data. The information in the received almanac data and/or ephemeris data is saved into the almanac database 122 and/or ephemeris database 124 portions of memory 120 in a suitable format, such as in a database or table. Coarse satellite orbital position information for a plurality of GNSS satellites resides in the almanac database 122. More accurate satellite orbital position information resides in the ephemeris database 124. Other embodiments may store the received almanac data and/or ephemeris data in other formats, memory regions, or even in other memory devices.

The GNSS estimation logic 126 is software stored in memory 120 that is used to estimate GNSS satellite positions. One skilled in the art will appreciate that the GNSS estimation logic 126 can be stored on any computer-readable medium for use by or in connection with any computer and/or processor related system or method. The GNSS position estimation logic 126 (retrieved and executed by the GNSS processor 28) estimates orbital position of selected visible GNSS satellites based upon the satellite orbital position information in the almanac database 122 and/or the ephemeris database 124.

Almanac data and ephemeris data is transmitted in portions in the GNSS satellite signals, and accordingly, some period of time is required to receive a complete set of almanac data and ephemeris data. Relatively recently acquired almanac data and ephemeris data is saved into the almanac database 122 and the ephemeris database 124, respectively, of memory 120. The receipt dates and times of the almanac and ephemeras data is also saved such that as assessment of the validity of the almanac data and the ephemeris data may be made by the GNSS processor 118 during the GNSS signal acquisition process. That is, the the almanac database 122 and/or the ephemeris database 124 must be relatively current for estimation of GNSS satellite orbital positions relative to the location of the GNSS device 100. Any suitable process for estimating the orbital position of a GNSS satellite relative to the GNSS device 100 may be used by the various embodiments of the GNSS device 100.

Accordingly, if information in the almanac database 122 and/or the ephemeris database 124 is to be used to estimate GNSS satellite orbital positions with a suitable degree of accuracy, then the information in the almanac database 122 and/or the ephemeris database 124 must be relatively current.

In one embodiment, a coarse satellite orbital position is estimated based upon the almanac information in the almanac database 122. Alternatively, a higher accuracy satellite orbital position may be estimated based upon the information in the ephemeris database 124. An estimate of current time may be required for either estimation.

However, if the information in the almanac database 122 and/or the ephemeris database 124 is not current, and/or an estimate of current time is not available, the estimated orbital positions of the GNSS satellites may be relatively inaccurate such that the signal acquisition process will not be able to utilize features of the various embodiments described herein. In such situations, the GNSS satellite signal acquisition process is performed using legacy GNSS signal acquisition techniques.

Once the GNSS processor 118 has estimated the orbital position for at least one visible GNSS satellite, embodiments of the GNSS device 100 use the estimated satellite orbital position information to adjust at least one parameter used in the FFT analysis of the detected GNSS satellite signal. One or more signal processing parameters may be adjusted by the various embodiments of the GNSS device 100.

Additionally, or alternatively, some embodiments of the GNSS device 100 use a signal threshold 128 parameter. The signal threshold 128 is a predefined parameter that is initialized during startup of the GNSS device 100. The signal threshold 128 is used to distinguish incoming weak signals, and/or signals with high levels of noise, from an incoming GNSS satellite signal.

In the various embodiments, the signal threshold 128 is an adjustable signal power threshold value, and/or is an adjustable signal-to-noise threshold value. Based upon the estimated orbital position of the GNSS satellite, the received signal strength and/or signal-to-noise (SN) ratio may be estimated for a signal emitted by the GNSS satellite. For example, a signal emitted from a GNSS satellite in an orbital position near the horizon will be significantly attenuated and/or distorted by the earth's atmosphere. On the other hand, a signal emitted from a GNSS satellite in an orbital position that is substantially overhead will be less attenuated and/or distorted by the earth's atmosphere.

Based on the estimated power and/or SN ratio, GNSS satellite signals that have characteristics corresponding to the estimated power and/or SN ratio can be readily identified. For example, in a plurality of frequency bins generated by the FFT analysis process, a frequency bin corresponding to the GNSS satellite will have a discernable correlation peak (a relatively high acquisition value, for example). Such frequency bins can be identified by their correlation peaks. Thus, an estimate is made to determine how much taller the correlation peak should be over the expected noise.

The signal power threshold and/or SN ratio threshold may be adjusted based on an estimated signal strength or an expected SN ratio that is determined from the estimated orbital position of the GNSS satellite. Accordingly, frequency bins having a corresponding signal strength greater than the adjusted signal strength threshold, or having a SN ratio greater than the SN ratio threshold, are identified during the GNSS satellite signal acquisition process. The identified frequency bins are then used for the GNSS satellite signal acquisition process.

Figure 2:
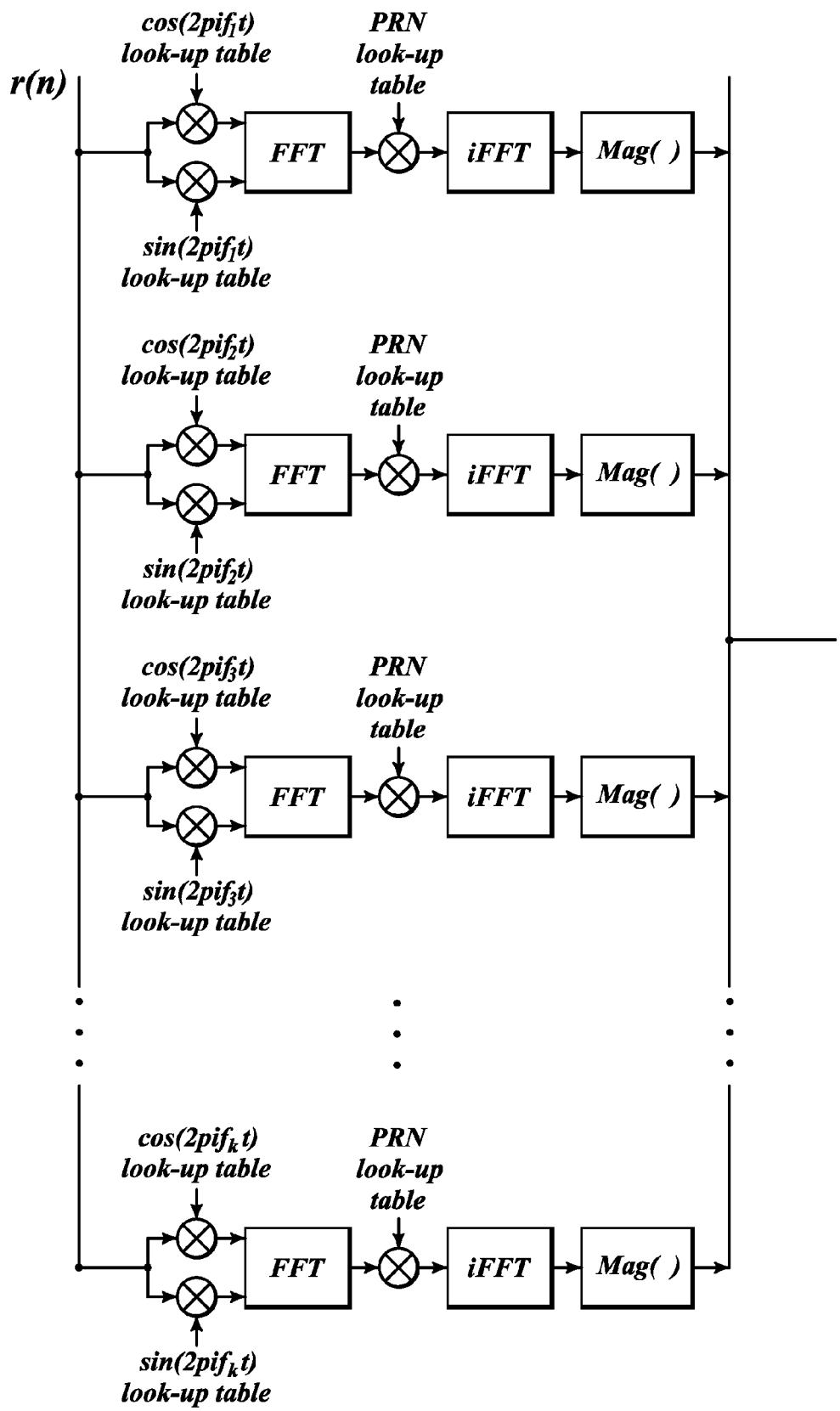
FIG. 2 is a block diagram illustrating a GNSS satellite signal correlation process using an Fast Fourier Transform (FFT) analysis process.

FIG. 2 is a block diagram illustrating a GNSS satellite signal correlation process using an FFT analysis process. The incoming digitized and downconverted GNSS satellite signal [r(n)] is processed by the GNSS system processor 104 (FIG. 1) using FFT techniques over a range of frequencies ($f_1$, $f_2$, ... $f_k$). At each particular frequency, the GNSS satellite signal r(n) is multiplied by cosine and sine functions. An FFT is computed of that mixed signal. The resultant FFT is then multiplied by the complex conjugate of the replica code for the satellite being searched at each frequency being searched. This previously determined complex conjugate FFT is retrieved from a look-up table or the like. The resulting complex conjugate is further processed by computing the inverse FFT (iFFT) to derive a magnitude value for each of the selected frequencies. The value is then stored in a frequency bin.

Figure 3:
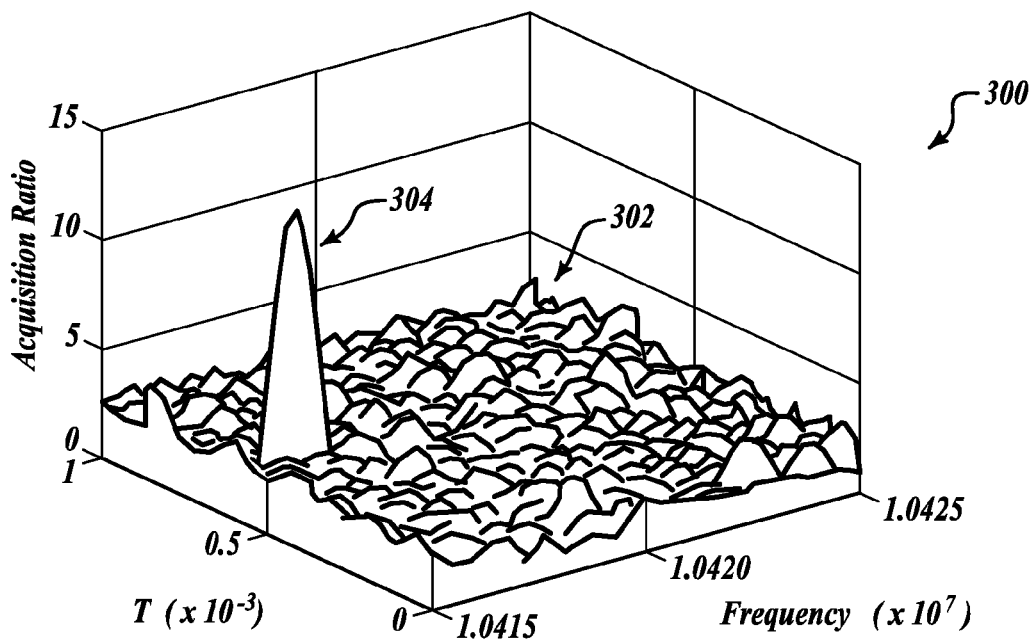
FIG. 3 is a conceptually illustrative three dimensional view of a plurality of frequency bins corresponding to a detected GNSS satellite signal.

FIG. 3 is a conceptually illustrative three dimensional view of a plurality of frequency bins 300 corresponding to a detected GNSS satellite signal. Most of the frequency bins 302 have a relatively low numerical value of the acquisition ratio. The numerical values of the acquisition ratio correspond to the degree of correlation between the signal hypothesis generated by the GNSS device 100 and the received GNSS satellite signal. The low numerical values of the acquisition ratio indicates detected noise or the like in the GNSS satellite signal for that particular frequency bin.

However, some of the frequency bins 304 have a very high value for its acquisition ratio. Here, the high value of the acquisition ratio corresponds to those frequency bins 304 that identify the frequency and time of the detected GNSS satellite signal. Legacy GNSS devices search the entire set of frequency bins 300 looking for the frequency bins 304. It is appreciated that such a search process, which unnecessarily includes processing of information in the frequency bins 302, is very time consuming.

Figure 4:
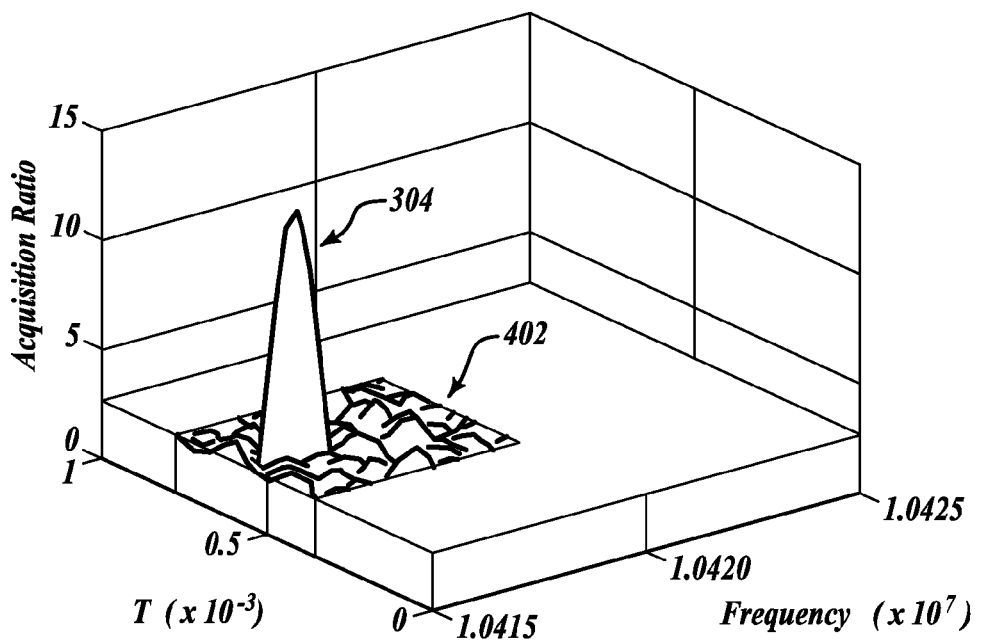
FIG. 4 is a conceptually illustrative three dimensional view of a reduced number of frequency bins that are searched during the GNSS satellite signal acquisition process.

One adjustable parameter is the number of frequency bins (and/or their respective location in a matrix) processed during the GNSS satellite signal acquisition process. FIG. 4 is a conceptually illustrative three dimensional view of a reduced number of frequency bins that are searched during the GNSS satellite signal acquisition process performed by an embodiment of the GNSS device 100. For example, one embodiment deselects some or all of the frequency bins 302 that are not expected to contain information corresponding to the GNSS satellite signal. For example, identified ones of the frequencies $f_1$ to $f_k$ (FIG. 2) may be deselected or the like.

Frequency bins that are deselected are identified based upon the estimated location of the GNSS satellite. The entire range of searchable frequency bins correspond to a range of possible locations of the GNSS satellite that is being acquired. For example, if the almanac data and/or ephemeris data is used to estimate that the GNSS satellite is directly overhead, it is appreciated that frequency bins corresponding to positions other than substantially overhead do not need to be searched. Thus, embodiments of the GNSS device 100 deselect those frequency bins that do not correspond to a substantially overhead position.

One embodiment estimates location of the GNSS satellite based upon the almanac data and/or ephemeris data. The embodiment identifies a predefined range of frequency bins about the frequency bin(s) that corresponds to the estimated location. Bins outside of that range ore deselected.

Thus, frequency bins are screened out, deleted, or otherwise identified as frequency bins that do not need to be processed during the GNSS satellite signal acquisition process. Accordingly, a reduced number of frequency bins 402 are processed by the GNSS device 100 during the GNSS satellite signal acquisition process. Another embodiment may select frequencies for a plurality of frequency bins that are expected to include the frequency bins 304. For example, selected ones of the frequencies $f_1$ to $f_k$ (FIG. 2) may be selected. Thus, signal acquisition frequency bins are selected for processing during the GNSS satellite signal acquisition process.

Figure 5:
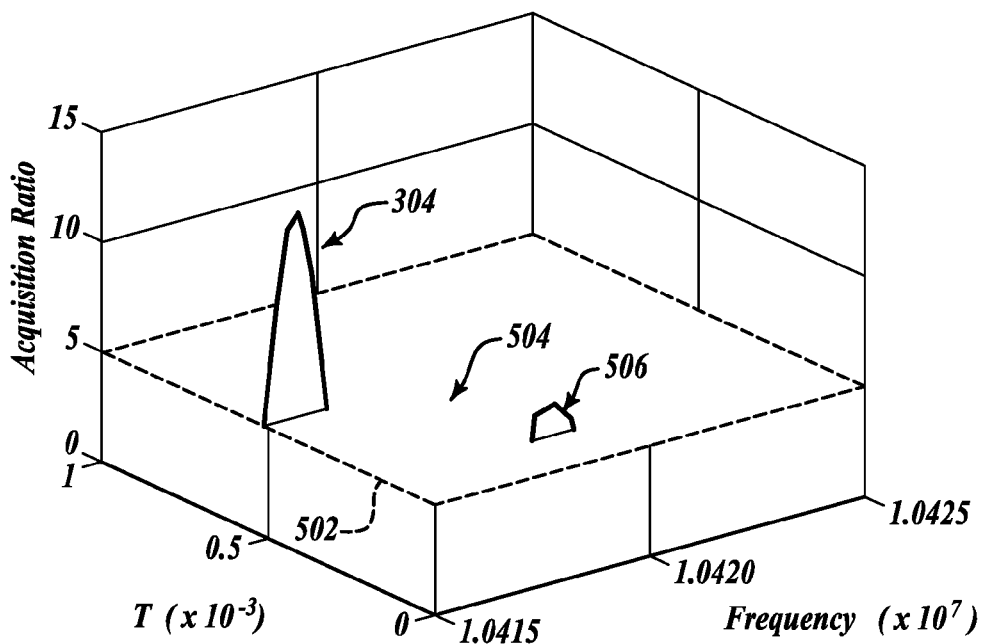
FIG. 5 is a conceptually illustrative three dimensional view of frequency bins that are searched during the GNSS satellite signal acquisition process after adjustment of a signal strength threshold by an embodiment of a GNSS device.

In another embodiment, the above-described signal threshold 128 (FIG. 1) may be adjusted based upon the expected characteristics of the GNSS satellite signal. FIG. 5 is a conceptually illustrative three dimensional view of frequency bins that are searched during the GNSS satellite signal acquisition process after adjustment of a signal strength threshold 502 by an embodiment of a GNSS device 100. The signal strength threshold 502 may be used to effectively screen out signals having signal strengths less than the threshold. As noted above, frequency bins which correspond to the acquired GNSS satellite signal have a discernable numerical value of the acquisition ratio. Other frequency bins that do not correspond to the GNSS satellite signal have no, or relatively small, numerical values for its acquisition ratio and can be identified. Such frequency bins are screened out, deleted, or otherwise identified as frequency bins that do not need to be processed during the GNSS satellite signal acquisition process.

In the exemplary frequency bins illustrated in FIG. 5, the signal strength threshold 502 has been adjusted such that frequency bins 504 having information corresponding to a signal strength less than the signal strength threshold 502 have been screened out, deleted, or otherwise identified as frequency bins that do not need to be processed during the GNSS satellite signal acquisition process. Some frequency bins 506 may have corresponding numerical values of their acquisition ratio that exceeds the signal strength threshold 502. These frequency bins 506 are selected for processing. In one embodiment, other screening processes or techniques may be used to screen out, delete, or otherwise identify some of these remaining frequency bins 506 as frequency bins that do not need to be further processed during the GNSS satellite signal acquisition process.

The frequency bins 304 corresponding to the GNSS satellite signal are identifiable by their acquisition ratio numerical values which correspond to having a signal strength that is greater than or equal to the signal strength threshold 502. Accordingly, the frequency bins 304 are readily identifiable. These frequency bins 304 may be selected for processing by the GNSS device 100 during the GNSS satellite signal acquisition process.

Figure 6:
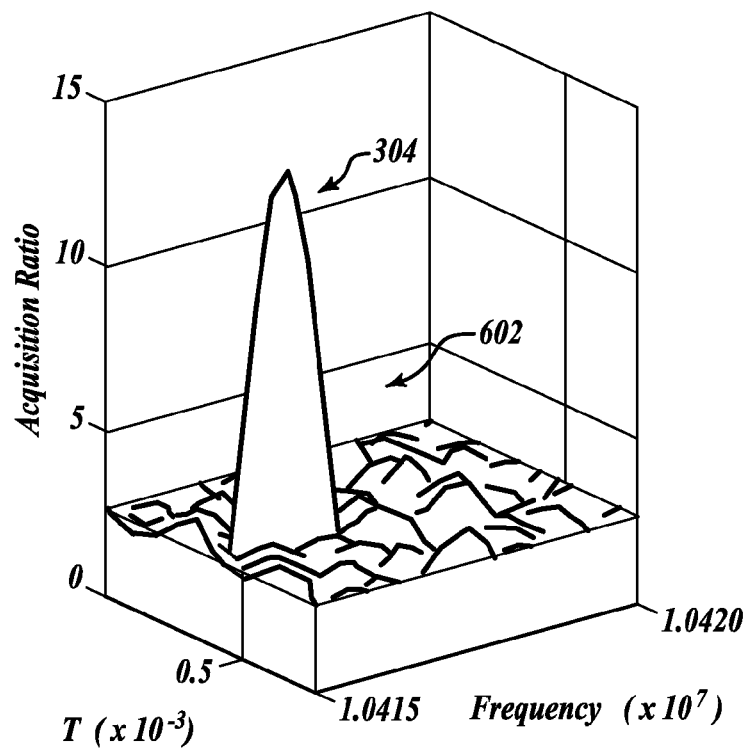
FIG. 6 is a conceptually illustrative three dimensional view of finer resolution frequency bins that are searched during the GNSS satellite signal acquisition process.

FIG. 6 is a conceptually illustrative three dimensional view of finer resolution frequency bins 602 that are searched during the GNSS satellite signal acquisition process. When orbital position of a GNSS satellite is estimated using the almanac database 122 and/or the ephemeris database 124, as noted above, frequency bins that are expected to contain information corresponding to the GNSS satellite signal may be identified. Such bins are identifiable by their time and by frequency. An alternative embodiment of the GNSS device 100 uses this information to construct higher resolution frequency bins 602. That is, the number of frequency bins 602 that are processed remains the same, or at least remain at a relatively large number compared to the number of bins 402 (FIG. 4). However, each frequency bin 602 corresponds to a narrower time period and/or a narrower frequency range. For example, the total frequency range of the processed frequency bins 602 is from $1.0415 \times 10^7$ Hz to $1.0420 \times 10^7$ Hz. In contrast, the the total frequency range of the processed frequency bins 300 (FIG. 3) is from $1.0415 \times 10^7$ Hz to $1.0425 \times 10^7$ Hz. Thus, the frequency range of each frequency bin 602 is half of the frequency range of the frequency bins 300 (FIG. 3).

Adjusting the time period and/or a frequency range so that the frequency bins have a higher resolution allows identification of the GNSS satellite signal with greater precision. Thus, the satellite's orbital position can be determined with a greater accuracy. Further, during the subsequent tracking process, the GNSS satellite signal may be more accurately tracked since its signal has been located with a higher degree of accuracy by using the higher resolution frequency bins 602 that correspond to a smaller time period and/or frequency range.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for acquiring a Global Navigation Satellite System (GNSS) signal, the method comprising:
    estimating an orbital position for at least one GNSS satellite based upon at least one of almanac data and ephemeris data;
    detecting a signal emitted from the at least one GNSS satellite; and
    based upon the estimated orbital position information for the at least one GNSS satellite, adjusting at least one signal threshold used in a GNSS satellite signal acquisition process in a navigational system processor;
    wherein the at least one signal threshold is one of a signal strength threshold or a signal-to-noise ratio threshold.

2. The method of claim 1, further comprising:
    selecting at least one frequency bin associated with a Fourier analysis of the signal such that the selected frequency bin is used in the GNSS satellite signal acquisition process, the selection of the at least one frequency bin based upon the estimated orbital position information for the at least one GNSS satellite.

3. The method of claim 1, further comprising:
    deselecting at least one frequency bin associated with a Fourier analysis of the signal such that the deselected frequency bin is not used in the GNSS satellite signal acquisition process the deselection of the at least one frequency bin based upon the estimated orbital position information for the at least one GNSS satellite.

4. The method of claim 1, wherein adjusting at least one signal threshold further comprises:
    based upon the estimated orbital position information for the at least one GNSS satellite, estimating a characteristic of the detected signal; and
    adjusting the at least one signal threshold based upon the estimated characteristic, wherein the method further comprises:
    identifying at least one frequency bin having a corresponding signal characteristic that corresponds to the adjusted signal threshold such that the identified frequency bin is used in the GNSS satellite signal acquisition process.

5. The method of claim 1, wherein adjusting at least one signal threshold further comprises:
    based upon the estimated orbital position information for the at least one GNSS satellite, estimating a signal-to-noise ratio of a signal emitted by the at least one GNSS satellite; and
    adjusting the signal-to-noise ratio threshold based upon the estimated signal-to-noise ratio, wherein the method further comprises:
    identifying at least one frequency bin having a corresponding signal-to-noise ratio that is greater than the adjusted signal-to-noise ratio threshold such that the identified at least one frequency bin is used in the GNSS satellite signal acquisition process.

6. The method of claim 1, wherein adjusting at least one signal threshold further comprises:
   based upon the estimated orbital position information for the at least one GNSS satellite, estimating a signal strength of the detected signal; and
   adjusting the signal strength threshold based upon the estimated signal strength, wherein the method further comprises:
   identifying at least one frequency bin having a corresponding signal strength that corresponds to the adjusted signal strength threshold such that the identified frequency bin is used in the GNSS satellite signal acquisition process.

7. The method of claim 1, wherein estimating the orbital position for the at least one GNSS satellite based upon at least one of the almanac data and the ephemeris data comprises:
   estimating a coarse satellite orbital position based upon the almanac data.

8. The method of claim 1, wherein estimating the orbital position for the at least one GNSS satellite based upon at least one of the almanac data and the ephemeris data comprises:
   estimating a high accuracy satellite orbital position based upon the ephemeris data.

9. The method of claim 1, wherein estimating the orbital position for the at least one GNSS satellite based upon at least one of the almanac data and the ephemeris data comprises;
   estimating a coarse satellite orbital position based upon the almanac data; and
   after estimation of the coarse satellite orbital position, estimating a high accuracy satellite orbital position based upon the ephemeris data.

10. The method of claim 1 further comprising:
    adjusting a frequency range of a frequency bin based upon the estimated orbital position information for the at least one GNSS satellite.

11. The method of claim 1 further comprising:
    adjusting a time range of a frequency bin based upon the estimated orbital position information for the at least one GNSS satellite.

12. The method of claim 1, further comprising:
    receiving the almanac data from a local memory.

13. The method of claim 1, further comprising:
    receiving the almanac data from a satellite signal prior to estimating the orbital position for the at least one GNSS satellite.

14. An apparatus that is configured to acquire a Global Positioning System (GNSS) signal, comprising:
    a GNSS front end -configured to receive a GNSS signal emitted by at least one GNSS satellite and configured to frequency downconvert the GNSS signal into a downconverted GNSS satellite signal by mixing the GNSS satellite signal with a local oscillator signal to shift the carrier frequency of the incoming GNSS satellite signal; and
    a GNSS system processor communicatively coupled to the GNSS front end and configured to:
    receive the downconverted GNSS satellite signal from the GNSS front end;
    convert the downconverted GNSS satellite signal to a digital GNSS satellite signal;
    process the digital GNSS satellite signal into a plurality of frequency bins;
    estimate an orbital position for at least one GNSS satellite based upon at least one of almanac data and ephemeris data;
    based upon the estimated orbital position information for the at least one GNSS satellite, adjust at least one signal threshold used in a GNSS satellite signal acquisition process; and
    based upon the adjusted signal threshold, identify at least one of the frequency bins that corresponds to the GNSS signal emitted by the GNSS satellite;
    wherein the signal threshold is one of a signal strength threshold or a signal-to-noise ratio threshold.

15. The apparatus of claim 14, wherein based upon the adjusted signal threshold, the processing system is configured to select a plurality of the frequency bins such that the selected frequency bins are used in the GNSS satellite signal acquisition process.

16. The apparatus of claim 14, wherein based upon the adjusted signal threshold, the processing system is configured to deselect a plurality of frequency bins such that the deselected frequency bins are not used in the GNSS satellite signal acquisition process.

17. The apparatus of claim 14, wherein, the processing system is configured to:
    estimate a signal-to-noise ratio corresponding to the received GNSS signal emitted by the at least one GNSS satellite;
    adjust the signal-to-noise ratio threshold based upon the estimated signal-to-noise ratio; and
    identify at least one frequency bin having a corresponding signal-to-noise ratio that is greater than the adjusted signal-to-noise ratio threshold such that the identified at least one frequency bin is used in the GNSS satellite signal acquisition process.

18. The apparatus of claim 14, wherein, the processing system is configured to:
    estimate a signal strength corresponding to the received GNSS signal emitted by the at least one GNSS satellite;
    adjust the signal strength threshold based upon the estimated signal strength; and
    identify at least one frequency bin having a corresponding signal strength that corresponds to the adjusted signal strength threshold such that the identified frequency bin is used in the GNSS satellite signal acquisition process.

19. The apparatus of claim 14, wherein the processing system is configured to estimate a coarse satellite orbital position based upon the almanac data.

20. The apparatus of claim 19, wherein the processing system is configured to, after estimation of the coarse satellite orbital position, estimate a high accuracy satellite orbital position based upon the ephemeris data.

* * * * *